Aug. 20, 1968    L. T. MORAWSKI ET AL    3,397,879
CLAMP
Filed July 5, 1966
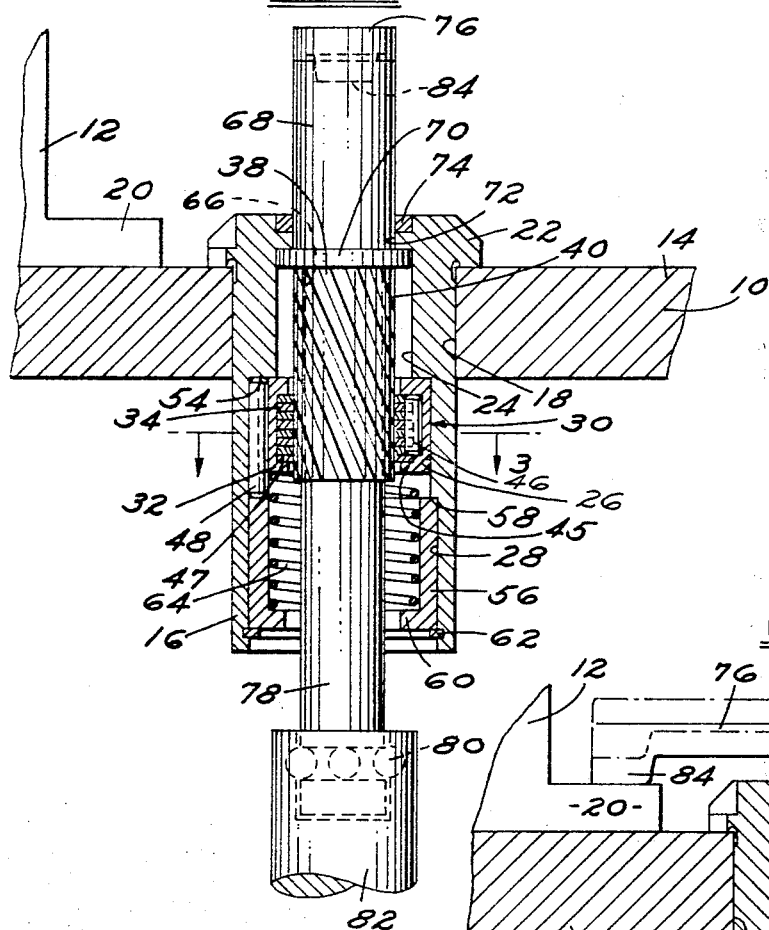
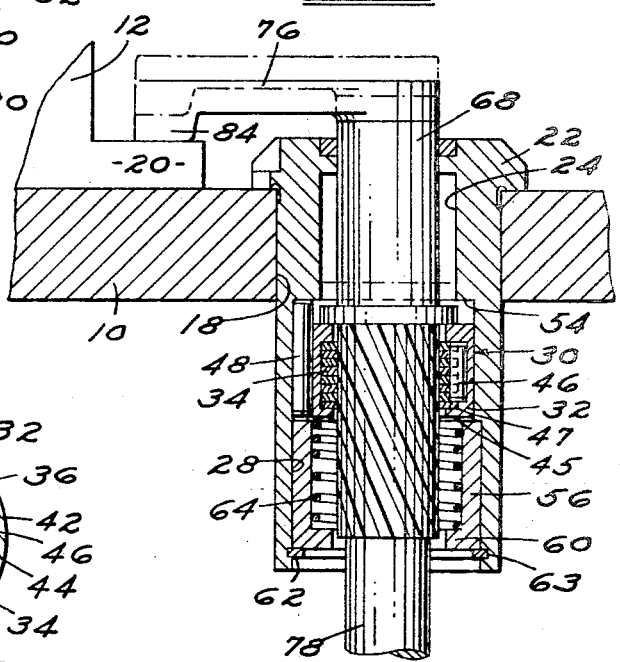
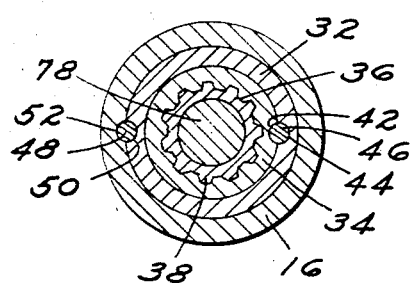
INVENTORS
LONDON T. MORAWSKI
JOHN J. PARKER
BY
Barnes, Kisselle, Laisch & Choate
ATTORNEYS

United States Patent Office 3,397,879
Patented Aug. 20, 1968

3,397,879
CLAMP
London T. Morawski and John J. Parker, Detroit, Mich.
(both of 11487 E. Nine Mile Road, Van Dyke, Mich.)
Filed July 5, 1966, Ser. No. 562,798
10 Claims. (Cl. 269—91)

This invention relates to a clamp structure and, more particularly, to a clamp structure for securely mounting a workpiece against a supporting surface. The clamp structure of the present invention may be used, for example, to clamp a workpiece on a fixture or for clamping a workpiece on the mounting face of a chuck or the like.

It is an object of the present invention to provide a clamp structure of relatively simple construction and of economical manufacture.

A further object of the invention resides in the provision of a clamp structure designed so that one or more parts thereof can be removed and replaced with other parts to accommodate the clamp structure to differently shaped workpieces.

In the drawings:

FIGURE 1 is a vertical sectional view of a clamp structure according to the present invention which illustrates the various parts in the released position of the clamp.

FIGURE 2 is a view similar to FIG. 1 and showing the parts in the clamped position.

FIGURE 3 is a sectional view along the line 3—3 in FIG. 1.

Referring to the drawings, a supporting plate is designated 10. Plate 10 can be the base plate of a fixture or could be the base support surface of a chuck or the like. A workpiece 12 is designed to be clamped solidly against the supporting member 14 of plate 10. The means for clamping workpiece 12 on plate 10 includes a cylindrical bushing 16 press-fitted or threaded into a bore 18 in plate 10. Since the clamping pressure is to be exerted on a flange 20 of the workpiece against the supporting face 14, bushing 16 is preferably provided with a cap or rim 22 at one end thereof which bottoms on the supporting face 14 of plate 10.

Bushing 16 is formed with three axially adjacent and radially stepped bores 24, 26 and 28 respectively. Within bore 26 there is arranged a cartridge assembly 30. Cartridge assembly 30 includes an outer tube 32 which houses a stack of rings 34. Each ring 34 has teeth 36 around its inner periphery. In assembling cartridge 30, rings 34 are initially arranged on a mandrel having exterior helical splines corresponding to the helical splines 38 on the member 40 with teeth 36 engaging the helical splines. The rings 34 are clamped together in an axial direction and a groove 42 is machined therein. The inner periphery of tube 32 is formed with a groove 44. When cartridge 30 is assembled, a pin 46 is arranged in groove 44 and the previously grooved rings 34 are then inserted one at a time within tube 32 so that the pin 46 interconnects rings 34 with tube 32 and also orients the successive rings 34 so that the teeth thereon will define helical grooves adapted to register with the helical splines 38 on member 40. Rings 34 are then locked in tube 32 in any suitable manner. In the arrangement shown rings 34 are locked in place by pressing the end 45 of the tube against a retaining ring 47. Cartridge 30 is locked against rotation within bore 26 by means of a pin 48 which is disposed in registering grooves 50, 52 formed on the outer periphery of tube 32 and bore 26 respectively. Pin 48 has a length corresponding to the axial dimension of bore 26 and at one end abuts against the shoulder 54 formed between bore 24 and bore 26.

Within bore 28 there is arranged a cup-shaped bushing 56 which at one end abuts against the shoulder 58 formed between bores 26 and 28. The opposite end of bushing 56 is formed with a radially inwardly extending flange 60 which abuts a snap ring 62 retained in a groove 63 adjacent the end of the outer cylindrical bushing 16. The inner diameter of bushing 56 is smaller than the diameter of bore 26. A compression spring 64 is arranged between the end 45 of cartridge 30 and the radially inwardly extending flange 60 on bushing 56.

As mentioned previously, member 40 is provided with external helical splines 38 thereon which mesh with the helical grooves formed by the teeth 36 in the stack of rings 34. Member 40 is fashioned with an internal through bore 66. Into one end of bore 66 there is press-fitted and/or brazed a shaft 68. Shaft 68 is fashioned with a flange 70 abutting one end of spline member 40 and extending radially outwardly beyond the outer periphery of member 40. Flange 70 has a diameter which corresponds with the diameter of bore 24. Shaft 68 extends through an opening 72 in cap 22 and the joint therebetween is protected by a seal 74. At the free projecting end of shaft 68 there is fixedly arranged a laterally extending clamping arm 76. Arm 76 is mounted on shaft 68 so that it can be removed therefrom when desired.

Within the other end of bore 66 in member 40 there is press-fitted and/or brazed an actuator rod 78 which has a rotatable connection as at 80 with a puller 82. Puller 82 is adapted to be shifted axially by any suitable means, such as a piston, rack and pinion, etc.

In FIG. 1 the parts are illustrated in the released position of the clamp. In this position spring 64 biases cartridge 30 so that the latter abuts against shoulder 54. When the clamp is released externally splined member 40 is in its uppermost position wherein the flange 70 abuts against cap 22. In this position of the assembly clamp arm 76 is spaced axially from the flange 20 of workpiece 12 and is rotated to an out-of-the-way position. When it is desired to clamp the workpiece 12 on the support plate 10, puller 82 is axially displaced so as to shift the externally splined member 40 axially in a direction away from cap 22; that is, in a downwardly direction as illustrated in the drawing. As member 40 is displaced axially downwardly, it is caused to rotate such that, when flange 70 engages the upper end of cartridge 30, clamp arm 76 is rotatably and axially displaced from the position shown in FIG. 1 to the position illustrated in broken lines in FIG. 2. In this position of clamp arm 76 spring 64 has not been compressed from the condition shown in FIG. 1. Further axial retraction of puller 82 causes cartridge 30 to be pulled downwardly by flange 70 and thus causes the heel 84 at the end of clamp arm 76 to be displaced downwardly into clamping engagement with flange 20 of workpiece 12. After flange 70 engages the upper end of cartridge 30 no further relative movement between members 30 and 40 occurs; and thus during the final clamping action of arm 76, heel 84 is moving exclusively in an axial direction and is not rotating.

With the arrangement thus described it will be appreciated that cartridge 30 and externally splined member 40 can be replaced with other corresponding parts having a different lead angle or opposite hand lead angle on the helical spline so as to control the degree and direction of rotation of clamp arm 76 in relation to its axial movement. It will also be appreciated that the use of individual rings as shown at 34 adapts the internally splined member for economical manufacture. The device is also designed so that it can be assembled and disassembled very readily. To assemble the device, the integral assembly of rod 78, member 40 and shaft 68 (with clamp arm 76 removed) is inserted axially into outer bushing 16 from the open end thereof. Pin 48 can then be inserted in the registering grooves 50, 52 to lock cartridge 30 against rotation. Thereafter the cup bushing 56 and spring 64 can be arranged in place and the whole assembly secured together by snap ring 62.

We claim:
1. A clamp structure comprising a body, an internally helically splined member fixed on said body against rotation and axially slidable thereon, spring means biasing said internally splined member axially in one direction against a shoulder on said body, an externally helically splined member meshing with the internally splined member, a clamp member connected with the externally splined member and having a radially extending clamp arm disposed such that when the externally splined member is shifted axially of the internally splined member, said arm is caused to simultaneously move axially and rotate about the axis of the externally splined member, means limiting axial movement of the externally splined member relative to the internally splined member in a direction opposite to said one direction and an actuator connected with said externally splined member for shifting the externally splined member in said opposite direction to displace said arm axially and rotate it until the last-mentioned means are effective to arrest relative movement between said splined members and to thereafter shift the two splined members as a unit axially relative to the body and thereby further shift said arm axially in a radially fixed position.

2. A clamping structure as called for in claim 1 wherein said body comprises a generally cylindrical casing enclosing said splined members and said spring means, said clamp member including a shaft projecting axially outwardly of one end of said casing with said arm attached to the projecting free end thereof, said actuator comprising a rod projecting axially outwardly of the opposite end of the cylindrical casing.

3. A clamping structure as called for in claim 1 wherein said clamp member and said actuator project axially from opposite ends of the externally splined member.

4. A clamping structure as called for in claim 1 wherein said internally splined member comprises a plurality of stacked rings each formed with teeth around their inner periphery, the teeth on adjacent rings being circumferentially staggered to interfit with the helical splines of the externally splined member and locking means interengaging said rings to prevent relative rotation thereof.

5. A clamping structure as called for in claim 4 including a tubular cartridge member having a cylindrical bore in which said rings are stacked, said stack of rings having an axially extending groove in the outer peripheral surface thereof, said cartridge having an axially extending groove in its inner periphery registering with said other groove, said locking means comprising a pin engaged in said registering grooves.

6. A clamping structure as called for in claim 5 wherein said body has a cylindrical bore in which said cartridge is slidably mounted.

7. A clamping structure as called for in claim 6 wherein said last-mentioned bore and the outer peripheral surface of said cartridge have registering axially extending grooves therein and a pin engaged in said last-mentioned registering grooves to prevent relative rotation between said body and cartridge.

8. A clamping structure as called for in claim 1 wherein said body has at least two axially adjacent and radially stepped cylindrical bores therein, said internally splined member being cylindrically shaped and slidably mounted in the larger of said two bores, the smaller of said two bores having a diameter larger than the outer diameter of the externally splined member, the internally splined member having an axial dimension substantially smaller than that of the externally splined member and an inner diameter smaller than said smaller bore.

9. A clamping structure as called for in claim 8 wherein said clamp member comprises a shaft extending axially from the end of the externally splined member adjacent said smaller diameter bore, said limiting means including a shoulder on said shaft adapted to abut the adjacent end of the internally splined member when the shaft is shifted axially in said opposite direction through a predetermined stroke.

10. A clamping structure as called for in claim 9 wherein said shaft has a portion slidably engaging said smaller bore.

References Cited
UNITED STATES PATENTS

| | | | |
|---|---|---|---|
| 1,412,170 | 4/1922 | Dixon | 279—1 |
| 1,769,034 | 7/1930 | Nell | 74—89.15 |
| 2,885,212 | 5/1959 | Garrison | 279—1 |

ROBERT C. RIORDON, *Primary Examiner.*

J. F. McKEOWN, *Assistant Examiner.*